US010809024B2

(12) United States Patent
Johnson, Jr.

(10) Patent No.: US 10,809,024 B2
(45) Date of Patent: Oct. 20, 2020

(54) LOWER RECEIVER MACHINING FROM GENERIC FORGING SYSTEM AND METHOD

(71) Applicant: Christopher W. Johnson, Jr., Longwood, FL (US)

(72) Inventor: Christopher W. Johnson, Jr., Longwood, FL (US)

( * ) Notice: Subject to any disclaimer, the term of this patent is extended or adjusted under 35 U.S.C. 154(b) by 19 days.

(21) Appl. No.: 16/051,901

(22) Filed: Aug. 1, 2018

(65) Prior Publication Data

US 2019/0041146 A1 Feb. 7, 2019

Related U.S. Application Data

(60) Provisional application No. 62/539,645, filed on Aug. 1, 2017.

(51) Int. Cl.
*F41A 3/66* (2006.01)
*B23P 15/00* (2006.01)
*F41A 17/38* (2006.01)
*B21K 23/00* (2006.01)

(52) U.S. Cl.
CPC ............. *F41A 3/66* (2013.01); *B21K 23/00* (2013.01); *B23P 15/00* (2013.01); *F41A 17/38* (2013.01)

(58) Field of Classification Search
CPC ............. F41A 3/66; F41A 11/02; F41A 35/00
See application file for complete search history.

(56) References Cited

U.S. PATENT DOCUMENTS

| 2013/0269231 A1* | 10/2013 | Pietrzyk | F41A 9/65 42/6 |
| 2017/0138685 A1* | 5/2017 | Beasley | F41A 9/71 |
| 2017/0146308 A1* | 5/2017 | Plumb | F41A 9/65 |

(Continued)

OTHER PUBLICATIONS http://www.biggerhammer.net/ar15/milspec/MIL-C-71186_(AR), (pp. 1-58), (Jan. 1994).

(Continued)

*Primary Examiner* — J. Woodrow Eldred
(74) *Attorney, Agent, or Firm* — Michael T. Abramson; Holland & Knight LLP (57) ABSTRACT

A method and apparatus for enabling handgun magazines to function in a rifle lower forging, may include a rifle lower forging. The rifle lower forging may include but is not limited to a recessed area on a side portion of the rifle lower forging configured to receive a handgun magazine release. The rifle lower forging may further include a vertical hole on a top portion of the rifle lower forging configured to receive an elongated portion to hold the handgun magazine release. The rifle lower forging may further include a hole perpendicular to the vertical hole configured to receive a handgun magazine release spring. The rifle lower forging may further include a horizontal slit on the top portion of the rifle lower forging configured to receive an ejector. The rifle lower forging may further include one or more apertures perpendicular to the horizontal slit each configured to receive a fastener to secure the ejector to the rifle lower forging. The rifle lower forging may further include a hollow portion proximate the horizontal slit configured to receive a handgun magazine.

22 Claims, 8 Drawing Sheets

Special Ejector Held in Place by Fastener(s) – Designed for Handgun Ammunition

Left Side (56) References Cited

U.S. PATENT DOCUMENTS

2019/0212085 A1\* 7/2019 Wilkinson ................ F41A 3/66

OTHER PUBLICATIONS http://www.militaryfactory.com/smallarms/detail.asp?smallarms_id=1011, (pp. 1-6).
https://en.wikipedia.org/wiki/Colt_9mm_SMG, (pp. 1-3).
https://en.wikipedia.org/wiki/M16_rifle, (pp. 1-23).
https://grabcad.com/library/mil-spec-ar-15-lower (pp. 1-4).

\* cited by examiner

LOWER RECEIVER MACHINING FROM GENERIC FORGING SYSTEM AND METHOD

RELATED CASES

This application claims the benefit of U.S. Provisional Application No. 62/539,645, filed on 1 Aug. 2017, the contents of which are all incorporated by reference.

BACKGROUND

The original AR15 "Mil-Spec" lower receiver was designed to function with the rifle round (e.g., .223/5.56×45 mm ammunition). It may be desired to have a similar rifle lower receiver that is capable of being fired using other types of ammunition (e.g., handgun ammunition).

BRIEF SUMMARY OF DISCLOSURE

In one example implementation, an apparatus for handgun magazines to function in a rifle lower forging, may include but is not limited to a rifle lower forging. The rifle lower forging may include but is not limited to a recessed area on a side portion of the rifle lower forging configured to receive a handgun magazine release. The rifle lower forging may further include a vertical hole on a top portion of the rifle lower forging configured to receive an elongated portion to hold the handgun magazine release. The rifle lower forging may further include a hole perpendicular to the vertical hole configured to receive a handgun magazine release spring. The rifle lower forging may further include a horizontal slit on the top portion of the rifle lower forging configured to receive an ejector. The rifle lower forging may further include one or more apertures perpendicular to the horizontal slit each configured to receive a fastener to secure the ejector to the rifle lower forging. The rifle lower forging may further include a hollow portion proximate the horizontal slit configured to receive a handgun magazine.

One or more of the following example features may be included. The forging may be a net shape generic rifle lower forging. The vertical hole on a top portion of the rifle lower forging may be configured to a receive a bolt as the elongated portion to hold the handgun magazine release. The vertical hole on a top portion of the rifle lower forging may be configured to a receive a roll pin as the elongated portion to hold the handgun magazine release. The horizontal slit on the top portion of the rifle lower forging may be off center. The one or more apertures perpendicular to the horizontal slit may be configured to receive a knurled screw as the fastener. The one or more apertures perpendicular to the horizontal slit may be configured to receive a serrated screw as the fastener. The rifle lower forging may be an 80% version. The rifle lower forging may be a 100% version. The rifle lower forging may be an AR15 lower forging.

In another example implementation, a method for producing a rifle lower to function with handgun magazines may include but is not limited to creating a recessed area on a side portion of a rifle lower configured to receive a handgun magazine release. A vertical hole may be created on a top portion of the rifle lower configured to receive an elongated portion to hold the handgun magazine release. A hole may be created perpendicular to the vertical hole configured to receive a handgun magazine release spring. A horizontal slit may be created on the top portion of the rifle lower configured to receive an ejector. One or more apertures may be created perpendicular to the horizontal slit each configured to receive a fastener to secure the ejector to the rifle lower. A hollow portion may be created proximate the horizontal slit configured to receive a handgun magazine.

One or more of the following example features may be included. The forging may be a net shape generic rifle lower forging. The vertical hole on a top portion of the rifle lower forging may be configured to a receive a bolt as the elongated portion to hold the handgun magazine release. The vertical hole on a top portion of the rifle lower forging may be configured to a receive a roll pin as the elongated portion to hold the handgun magazine release. The horizontal slit on the top portion of the rifle lower forging may be off center. The one or more apertures perpendicular to the horizontal slit may be configured to receive a knurled screw as the fastener. The one or more apertures perpendicular to the horizontal slit may be configured to receive a serrated screw as the fastener. The rifle lower forging may be an 80% version. The rifle lower forging may be a 100% version. The rifle lower forging may be an AR15 lower forging. The rifle lower may be created via extrusion. The rifle lower may be created via casting.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

Overview:

As will be discussed in greater detail below, the original AR15 "Mil-Spec" lower receiver was designed to function with the rifle round (e.g., .223/5.56×45 mm ammunition). It may be desired to have a similar rifle lower receiver that is capable of being fired using other types of ammunition (e.g., handgun ammunition). For example, there may be a 9 mm version of the AR15 lower (e.g., Colt 9 mm SMG), which may utilize the square "UZI" style box magazine and Colt box magazine. Colt SMG is a generic term used for lowers that work with the square non-feed ramp uzi style magazines. The "UZI" style 9 mm magazine is different than the other magazine types that may be supported (e.g., it is smaller), and there is no prior known technique to engineer larger shaped handgun magazines to function in a generic AR15 lower forging. The present disclosure may be designed to permit magazines that are larger than the "Colt UZI" magazine to function in a forged lower receiver. Moreover, generally, handgun ammunition compatible AR15 lowers are machined from a large rectangular block of metal billet. That is, manufacturers may start with a piece of metal that is larger than the generic AR15 lower forging (typically a rectangular piece of metal billet). With a forging, one may be "limited" to machining within the physical material size of a forging, whereas a block of billet may be any size and typically has extra material that must be machined in a way to make the product function properly. Using a billet may be time consuming and may take, e.g., up to 3 times longer (or more) to machine a finished lower than it does starting from a forging).

Figure 1:
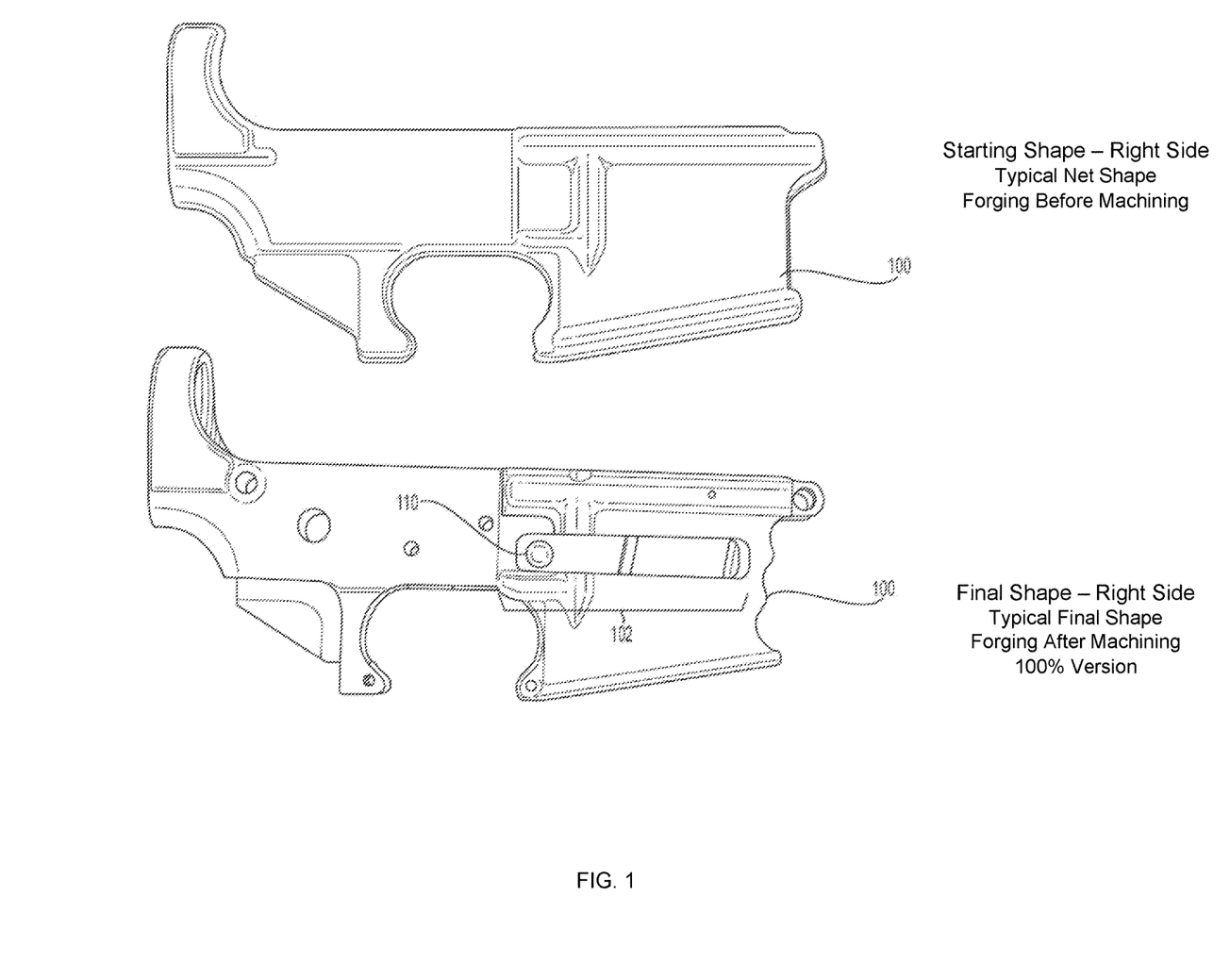
FIG. 1 is an example diagrammatic right side view of a typical starting net shape of a forging before machining and a final shape of the forging after machining according to one or more example implementations of the disclosure.
Figure 2:
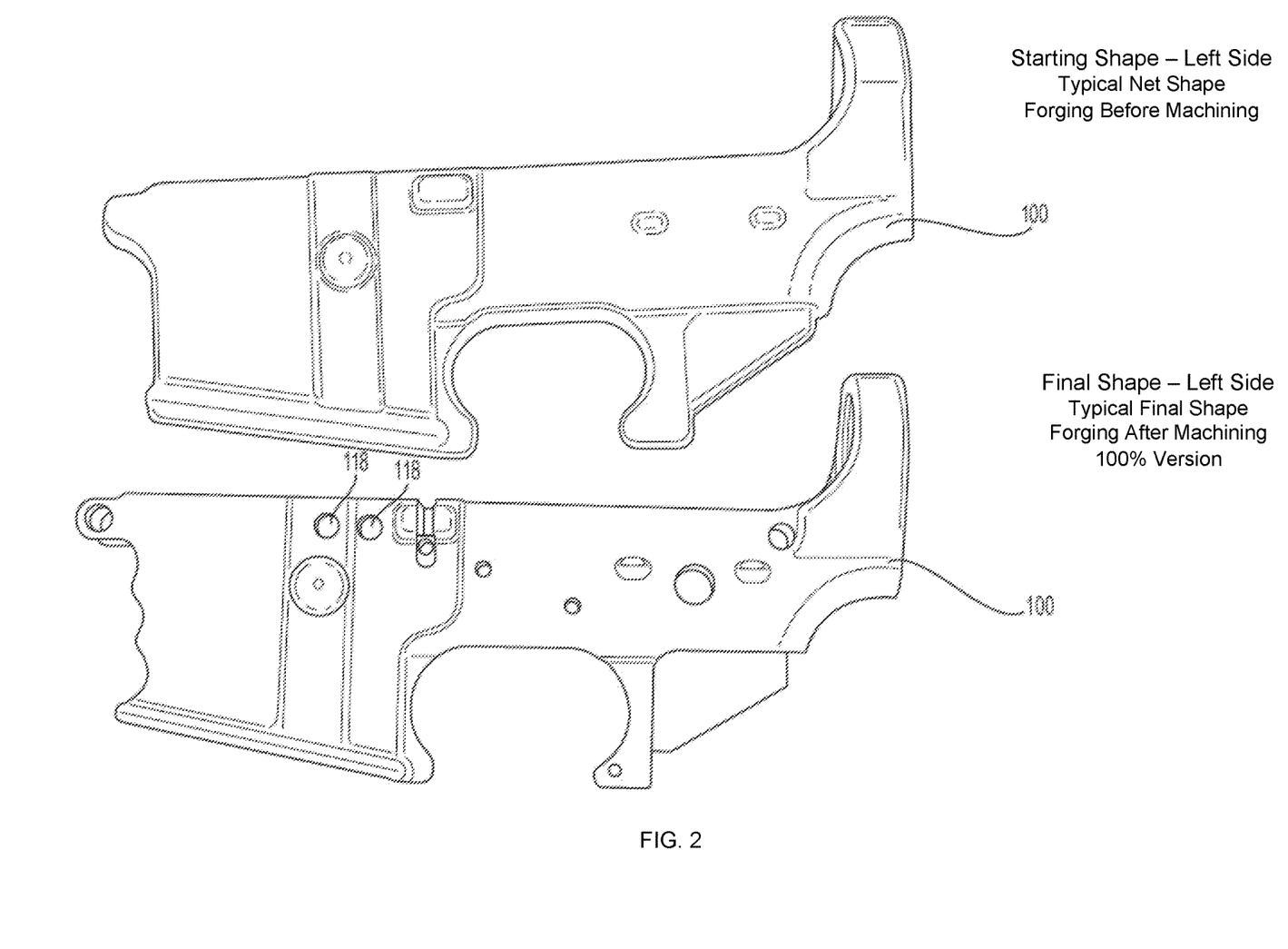
FIG. 2 is an example diagrammatic left side view of a typical starting net shape of a forging before machining and a final shape of the forging after machining according to one or more example implementations of the disclosure.
Figure 3:
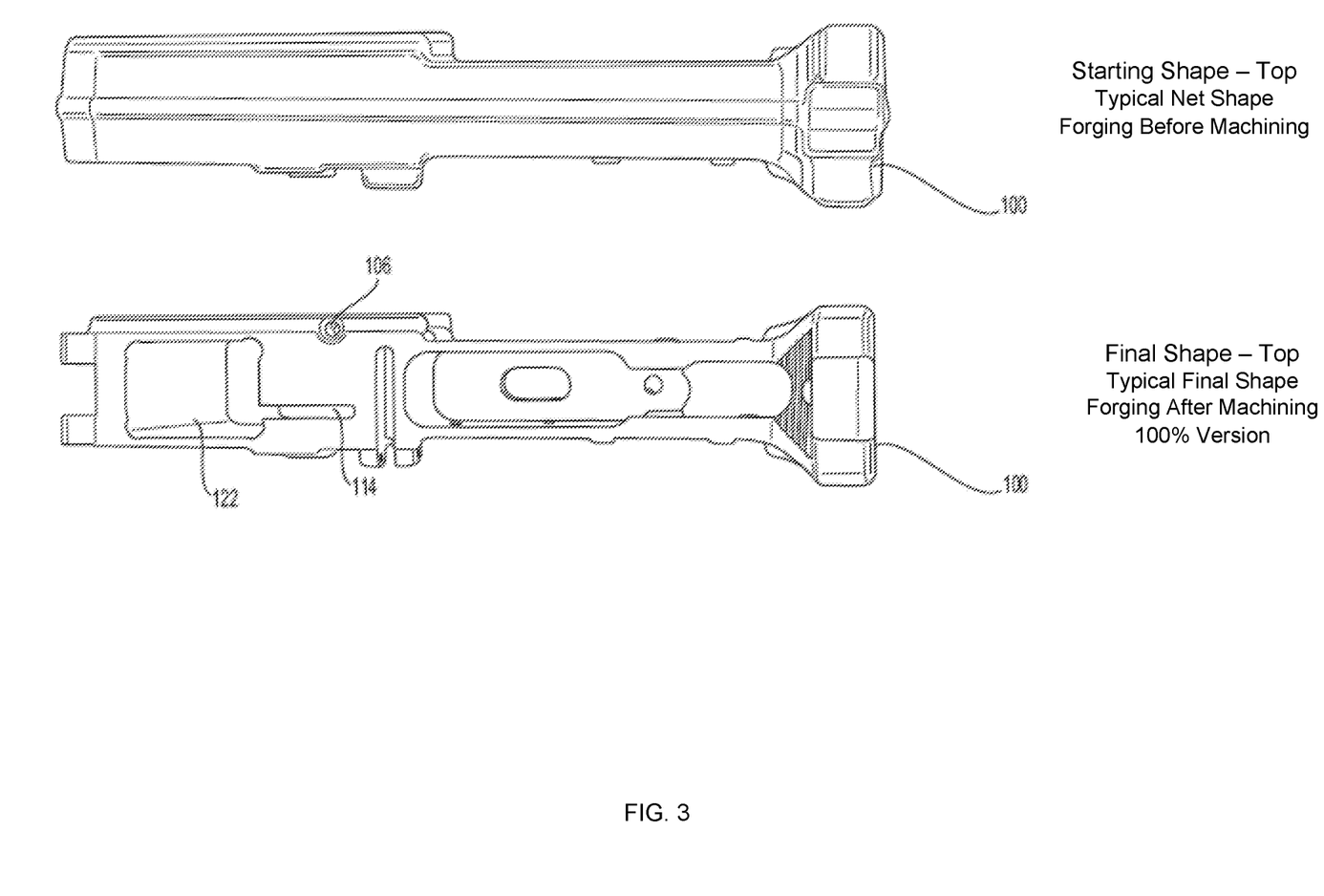
FIG. 3 is an example diagrammatic top view of a typical starting net shape of a forging before machining and a final shape of the forging after machining according to one or more example implementations of the disclosure.
Figure 4:
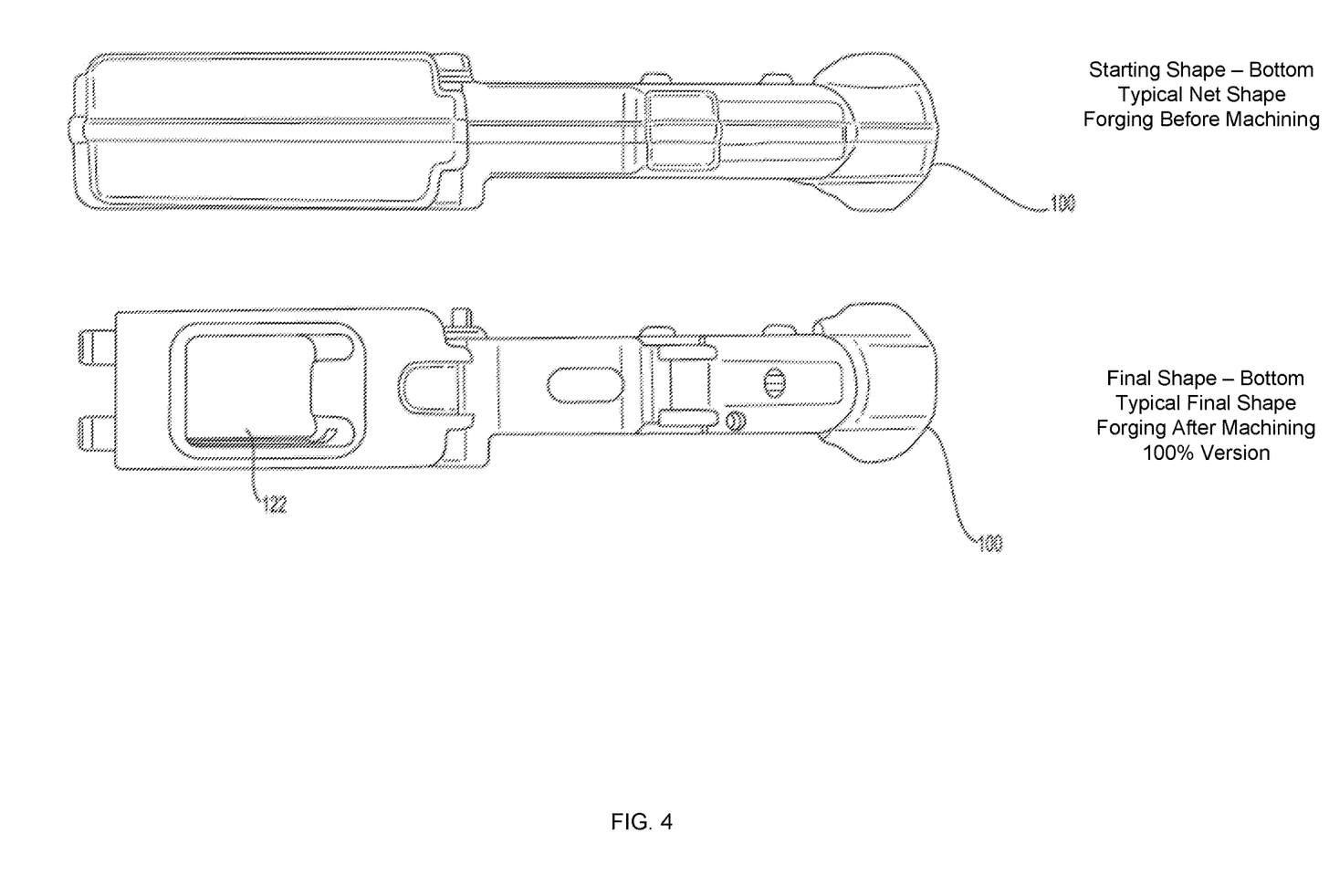
FIG. 4 is an example diagrammatic bottom view of a typical starting net shape of a forging before machining and a final shape of the forging after machining according to one or more example implementations of the disclosure.
Figure 5:
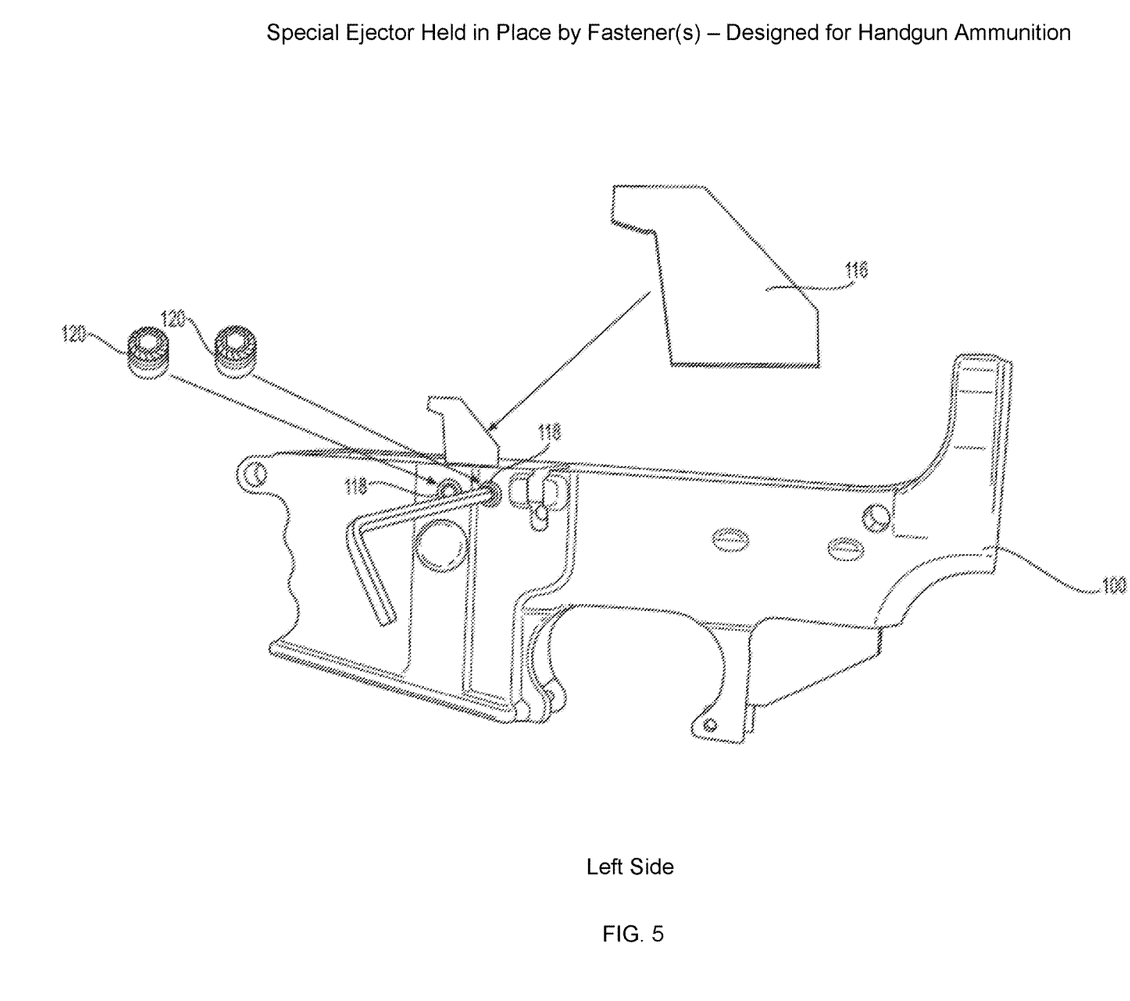
FIG. 5 is an example diagrammatic left side view of a forging after machining with an ejector and fasteners according to one or more example implementations of the disclosure.
Figure 6:
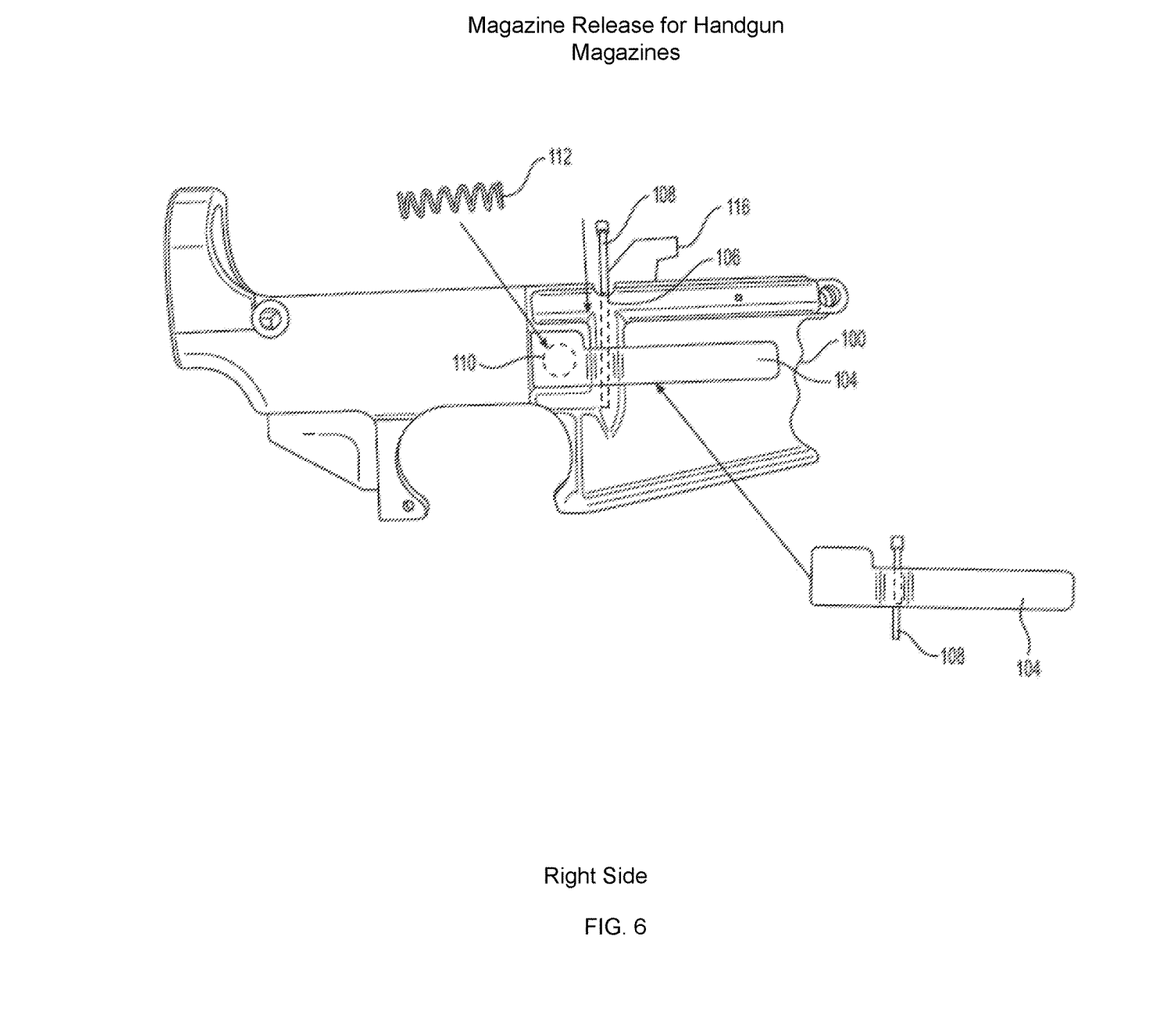
FIG. 6 is an example diagrammatic right side view of a forging after machining with the magazine release according to one or more example implementations of the disclosure.
Figure 7:
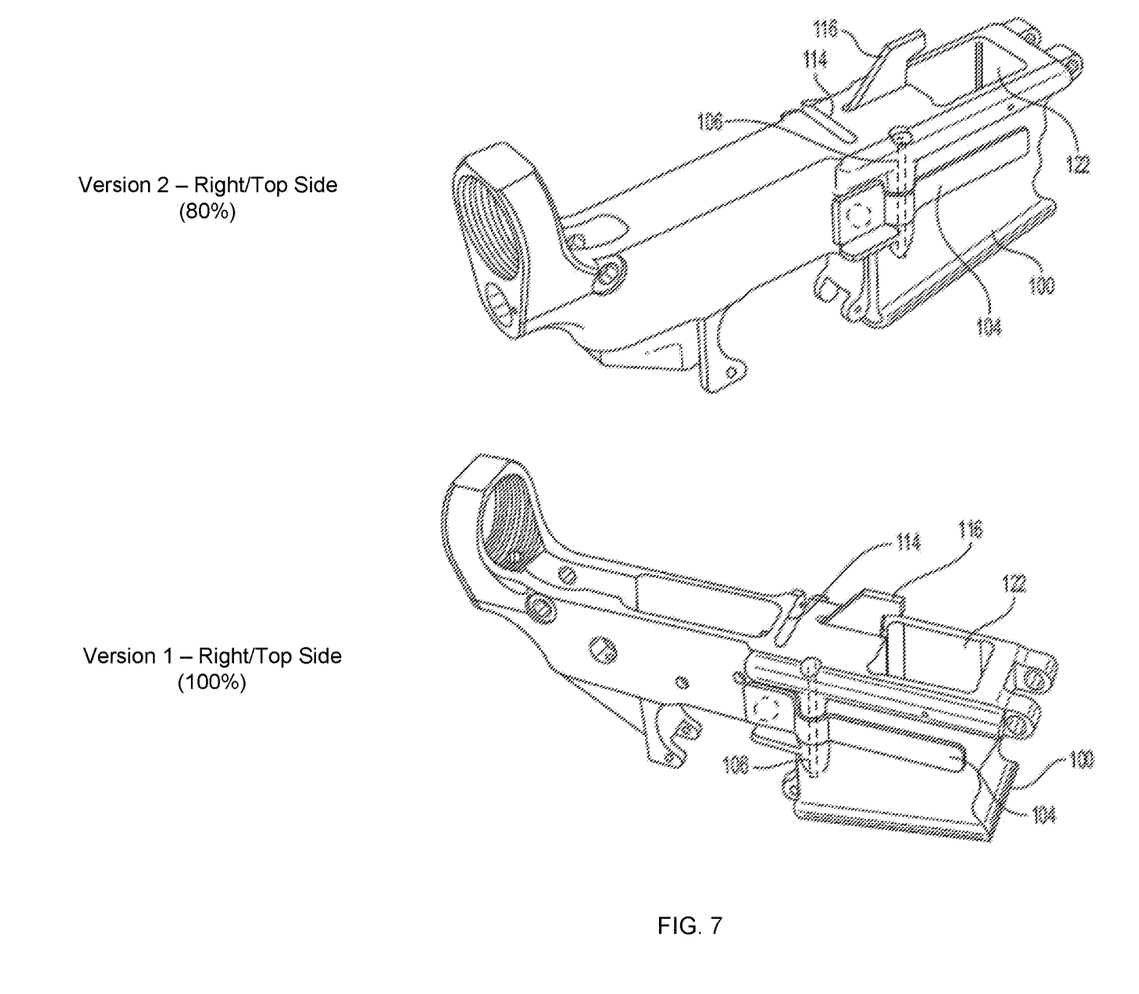
FIG. 7 is an example diagrammatic bottom view of an 80% version and a 100% version of a forging after machining according to one or more example implementations of the disclosure.
Figure 8:
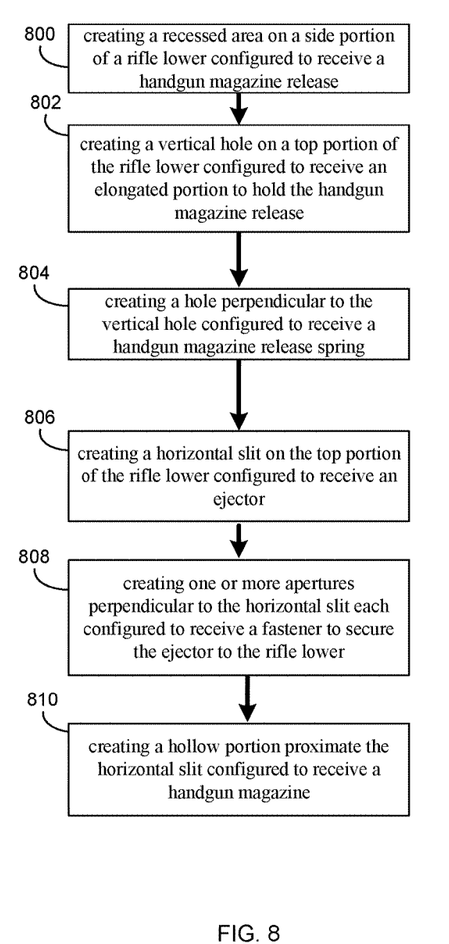
FIG. 8 is an example flowchart of a method for producing an example AR15 lower receiver from a typical net shape forging according to one or more example implementations of the disclosure.

As will also be discussed below, the present disclosure may be used (e.g., by hand and/or with standard machining, extrusion, casting, etc. techniques and equipment) to create 800 a recessed area on a side portion of a rifle lower configured to receive a handgun magazine release. A vertical hole may be created 802 on a top portion of the rifle lower configured to receive an elongated portion to hold the handgun magazine release. A hole may be created 804 perpendicular to the vertical hole configured to receive a handgun magazine release spring. A horizontal slit may be created 806 on the top portion of the rifle lower configured to receive an ejector. One or more apertures may be created 808 perpendicular to the horizontal slit each configured to receive a fastener to secure the ejector to the rifle lower. A hollow portion may be created 810 proximate the horizontal slit configured to receive a handgun magazine.

In some implementations, the block diagrams in the figures illustrate the architecture, functionality, and operation of possible implementations of apparatus and methods according to various implementations of the present disclosure. Each block diagram, and combinations of block diagrams, may represent a module for implementing the specified function(s)/act(s). It will be appreciated that while specific dimensions and locations of certain elements of the present disclosure are shown, other dimension, locations, and combinations of elements may be used without departing from the scope of the disclosure to realize at least some advantages discussed herein. As such, the specific discussion and figures should be taken as example only and not to otherwise limit the scope of the disclosure.

As discussed above and referring also at least to the example implementations of FIGS. 1-8, the present disclosure may enable a rifle lower forging to function with handgun magazines. For instance, in some implementations, the rifle lower forging may be an AR15 lower forging (e.g., AR15 lower forging 100). In the example, the basic design shown in the figures is the "starting shape" of a standard AR15 Mil-Spec design compatible with .223/5.56 rifle ammunition. However, it will be appreciated that the present disclosure may be implemented with a slightly larger generic forging as the starting shape." Thus, the exact size of the starting shape should be taken as example only.

It will be appreciated that other types of lower receivers other than AR15 lower receivers may be used without departing from the scope of the present disclosure. For example, the present disclosure has been tested with, e.g., the 9×19 mm handgun round combined with a Glock™ 9 mm Luger™ handgun magazine, however, many other alternate handgun magazines may also be used with this design after minor modification.

In some implementations, the forging may be a "net shape" generic rifle lower forging. For instance, in some implementations, the present disclosure may permit an AR15 (or other firearm) lower receiver (in its final machined part) that may be machined from a generic forging to, e.g., fire, feed and function with different types of handgun magazines (e.g., Glock™, Sig Sauer™, Beretta™, Smith & Wesson™ (S&W), Hekler & Koch™, etc.), which may have their own unique shapes, and their corresponding ammunition (e.g., 9 mm/.40/.357/10 mm/.45 rounds). Generic forged AR15 lower receivers may be available from several different suppliers. Each of these generic forgings may be "Net Shape" starting point, where they may be originally designed to function with .223/5.56×45 mm ammunition. Typically, generic lower forgings may have been optimized to "reduce machining time" by reducing the amount of material that must be removed to function properly in the final product (e.g., AR15). Generally, each individual forging may not be exactly the same size, however, they are typically close to the same final net shape (e.g., within +−0.030).

As will be discussed below, the present disclosure shows example design changes that may be made to the basic "AR15 Mil-Spec design" so different types of handgun magazines and their calibers may be able to fire and function within the size constraints of a generic AR15 lower forging. For example, in some implementations, the rifle lower forging may include a recessed area (e.g., recessed area 102) on a side portion of the rifle lower forging configured to receive a handgun magazine release (e.g., handgun magazine release 104). The recessed area may be specific to the handgun magazine and handgun magazine release. Both the recessed area and handgun magazine release may be designed for each handgun magazine type.

In some implementations, the rifle lower forging may further include a vertical hole (e.g., vertical hole 106) on a top portion of the rifle lower forging configured to receive an elongated portion to hold the handgun magazine release. For example, in some implementations, the handgun magazine release may be placed in the recessed area, and secured by the elongated portion. In some implementations, the vertical hole on the top portion of the rifle lower forging may be configured to a receive a bolt (e.g., bolt 108) as the elongated portion to hold the handgun magazine release. It will be appreciated that other types of elongated portions may be used to hold the handgun magazine release in the recessed area without departing from the scope of the disclosure. For example, in some implementations, the vertical hole on the top portion of the rifle lower forging may be configured to a receive a roll pin as the elongated portion to hold the handgun magazine release. As such, the use of a bolt should be used an example only and not to otherwise limit the scope of the disclosure.

Notably, unlike the present disclosure, the above-noted COLT SMG utilizes the original AR15 magazine release, and does not have a special handgun magazine release, as that design has a straight feed of the COLT SMG 9 mm magazine to work with the original AR15 Magazine release.

In some implementations, the rifle lower forging may further include a hole (e.g., hole 110) perpendicular to the vertical hole configured to receive a handgun magazine release spring (e.g., handgun magazine release spring 112). In some implementations, magazine release 104, spring 112 and bolt 108 work together to retain the handgun magazine. Locking the magazine in place allows the round to be loaded/fed from the magazine into the chamber so it can be fired. Notably, the COLT SMG design utilizes a straight feed magazine without feed ramps, and feed ramps must be added to the lower so the round can be fed from the magazine into the chamber. By contrast, the present disclosure is designed to work with handgun magazines that have built in angled feed ramps. The angled feed ramps allow the round to be loaded/fed from the magazine into the chamber so it can be fired.

With a standard AR15 magazine release (e.g., used by the COLT SMG design), the standard AR15 magazine release is connected to the magazine catch with a threaded connector rod and the spring rides on this connector rod. On the standard AR15 magazine release, one depresses the magazine release button to disengage the magazine catch, and the standard AR15 the magazine release and magazine catch are located on opposite sides of the firearm. In contrast, the present disclosure has the magazine release and the magazine catch relocated to the same side of the lower receiver. In some implementations, the magazine release and magazine catch have been combined into a single piece that is designed to pivot on the bolt or pin to catch and release the handgun magazine. The magazine catch is held in place against the magazine via spring tension applied near the magazine release.

In some implementations, the rifle lower forging may further include a horizontal slit (e.g., horizontal slit 114) on the top portion of the rifle lower forging configured to receive an ejector (e.g., ejector 116). In some implementations, the horizontal slit on the top portion of the rifle lower forging may be off center (e.g., as can be seen more clearly at example FIG. 3). In the example, ejector 116 may be placed, at least in part, within horizontal slit 114. Horizontal slit 114 that will hold ejector 116 may be specific to each handgun magazine design. Ejector 116 is designed to start the case extraction process after the round has been fired. After the round has been fired, ejector 116 hits the case of the bullet knocking it free so the extractor can remove the fired round. Unlike the COLT SMG design (which has an ejector held in place with a bolt that goes through the ejector), the ejector of the present disclosure may be held in place with two screw fasteners (discussed below).

In some implementations, the rifle lower forging may further include one or more apertures (e.g., apertures 118) perpendicular to the horizontal slit each configured to receive a fastener (e.g., fastener 120) to secure the ejector to the rifle lower forging. In some implementations, the one or more apertures perpendicular to the horizontal slit may be configured to receive a knurled screw as the fastener, and in some implementations, the one or more apertures perpendicular to the horizontal slit may be configured to receive a serrated screw as the fastener. It will be appreciated that other types of fasteners and means for fastening may be used without departing from the scope of the disclosure. For instance, ejector 116 may be welded or an epoxy may be used to hold it in place. It may also be possible to have ejector 116 held in place with a through hole fastener.

In some implementations, the rifle lower forging may further include a hollow portion (e.g., hollow portion 122) proximate the horizontal slit configured to receive a handgun magazine. In the example, hollow portion 122 (e.g., machined area for the handgun round magazine) may be sized according to the desired handgun magazine size to be used in the final product (i.e., the rifle).

In some implementations, the rifle lower forging may be an 80% version, and in some implementations, may be a 100% version. With the 100% version, the Alcohol, Tobacco, Firearms (ATF) considers this version a firearm. This version of the lower receiver is a 100% fully functional, serialized and registered with the ATF. With the 80% version, the ATF does not consider it a firearm, as it is missing several holes and pockets. It will be appreciated that the actual percentages of completeness will vary, and as such, the term "80%" should be used to denote a lower receiver that is not yet functional (as it is missing several holes and pockets required for full functionality (as shown in example FIG. 7). That is, "80%" is a generic term that was created by the firearms market and does not necessarily truly mean 80%. The ATF has issued determination letters declaring that lowers that are missing several key features are not firearms. These lowers are considered 80% lowers by the market. They are typically missing the hole for the fire control group (trigger) and cross holes to hold the trigger and safety. The lower receiver may be built into both the 80% and 100% version. With the 80% version, the user may be making the unit functional. In some implementations, the lower receiver may have already been machined into the product and "in place" for both versions of the product.

In some implementations, the present disclosure may be implemented with another generic near "net shape" technique. For example, in some implementations, the rifle lower may be created via extrusion. In some implementations, the rifle lower may be created via casting. For example, with extrusion and casting, the end result may have a shape that is very similar to the "Net Shape Forging." A user may also start out with a larger forging than a "Net Shape Forging" and cut the product into it (this would be similar to starting from a billet rectangle block. As such, the use of machining/forging should be taken as example only and not to otherwise limit the scope of the disclosure.

In some implementations, the rifle lower forging may allow for adjustment in the lower to eliminate movement between the upper and lower receiver. For example, on the AR15, the upper and lower receiver mate together and this forms the basic platform. Depending on tolerances, the upper to lower receiver fitment may be inaccurate (loose fitment). This loose fitment may cause accuracy issues with the firearm. To solve this issue, the present disclosure may include an optional designed adjustment screw into the lower that can be used to take up the slack of a loose fitment between the upper and lower.

As a result of the present disclosure (in addition to the example and non-limiting advantages noted above), there may be time saving, as it may typically take, e.g., up to 3 times longer to machine a finished lower from a block of billet than it does starting from a forging. Additionally, the present disclosure may utilize the current inventory of AR15 lower generic forgings (i.e., there is no requirement for specialty AR15 lower forgings as the starting shape), and one may utilize this common raw material in the generic forging as a starting point for a dedicated handgun magazine AR platform lower. Additionally, the present disclosure may increase the current strength of the final product, since, for example, the forging is stronger the way it is originally made.

While the present disclosure may be shown using an AR15 lower, it will be appreciated that the disclosure may be modified for use with other types of rifle lowers (e.g., 308/AR10, etc.) by using a different platform. As such, the use of an AR15 lower should be taken as example only and not to otherwise limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. An apparatus for handgun magazines to function in a rifle lower forging comprising:
    a rifle lower forging, including:
        a recessed area on a side portion of the rifle lower forging configured to receive a handgun magazine release;
        a vertical hole on a top portion of the rifle lower forging configured to receive an elongated portion to hold the handgun magazine release;
        a hole perpendicular to the vertical hole configured to receive a handgun magazine release spring;
        a horizontal slit on the top portion of the rifle lower forging configured to receive an ejector;
        one or more apertures perpendicular to the horizontal slit each configured to receive a fastener to secure the ejector to the rifle lower forging; and
        a hollow portion proximate the horizontal slit configured to receive a handgun magazine.

2. The apparatus of claim 1 wherein the forging is a net shape generic rifle lower forging.

3. The apparatus of claim 1 wherein the vertical hole on a top portion of the rifle lower forging is configured to a receive a bolt as the elongated portion to hold the handgun magazine release.

4. The apparatus of claim 1 wherein the vertical hole on a top portion of the rifle lower forging is configured to a receive a roll pin as the elongated portion to hold the handgun magazine release.

5. The apparatus of claim 1 wherein the horizontal slit on the top portion of the rifle lower forging is off center of the top portion of the rifle lower forging.

6. The apparatus of claim 1 wherein the one or more apertures perpendicular to the horizontal slit is configured to receive a knurled screw as the fastener.

7. The apparatus of claim 1 wherein the one or more apertures perpendicular to the horizontal slit is configured to receive a serrated screw as the fastener.

8. The apparatus of claim 1 wherein the rifle lower forging is an 80% version where the rifle lower forging is missing at least one of one or more holes and one or more pockets needed for full functionality.

9. The apparatus of claim 1 wherein the rifle lower forging is a 100% version where the rifle lower forging has full functionality.

10. The apparatus of claim 1 wherein the rifle lower forging is an assault rifle lower forging.

11. A method for producing a rifle lower to function with handgun magazines comprising:
    creating a recessed area on a side portion of a rifle lower configured to receive a handgun magazine release;
    creating a vertical hole on a top portion of the rifle lower configured to receive an elongated portion to hold the handgun magazine release;
    creating a hole perpendicular to the vertical hole configured to receive a handgun magazine release spring;
    creating a horizontal slit on the top portion of the rifle lower configured to receive an ejector;
    creating one or more apertures perpendicular to the horizontal slit each configured to receive a fastener to secure the ejector to the rifle lower; and
    creating a hollow portion proximate the horizontal slit configured to receive a handgun magazine.

12. The method of claim 11 wherein the AR15 lower is a net shape generic rifle lower forging.

13. The method of claim 11 wherein the vertical hole on a top portion of the rifle lower is configured to a receive a bolt as the elongated portion to hold the handgun magazine release.

14. The method of claim 11 wherein the vertical hole on a top portion of the rifle lower is configured to a receive a roll pin as the elongated portion to hold the handgun magazine release.

15. The method of claim 11 wherein the horizontal slit on the top portion of the rifle lower is off center of the top portion of the rifle lower forging.

16. The method of claim 11 wherein the one or more apertures perpendicular to the horizontal slit is configured to receive a knurled screw as the fastener.

17. The method of claim 11 wherein the one or more apertures perpendicular to the horizontal slit is configured to receive a serrated screw as the fastener.

18. The method of claim 11 wherein the rifle lower is an 80% version where the rifle lower forging is missing at least one of one or more holes and one or more pockets needed for full functionality.

19. The method of claim 11 wherein the rifle lower is a 100% version where the rifle lower forging has full functionality.

20. The method of claim 11 wherein the rifle lower is an assault rifle lower forging.

21. The method of claim 11 wherein the rifle lower is created via extrusion.

22. The method of claim 11 wherein the rifle lower is created via casting.

\* \* \* \* \*